UNITED STATES PATENT OFFICE.

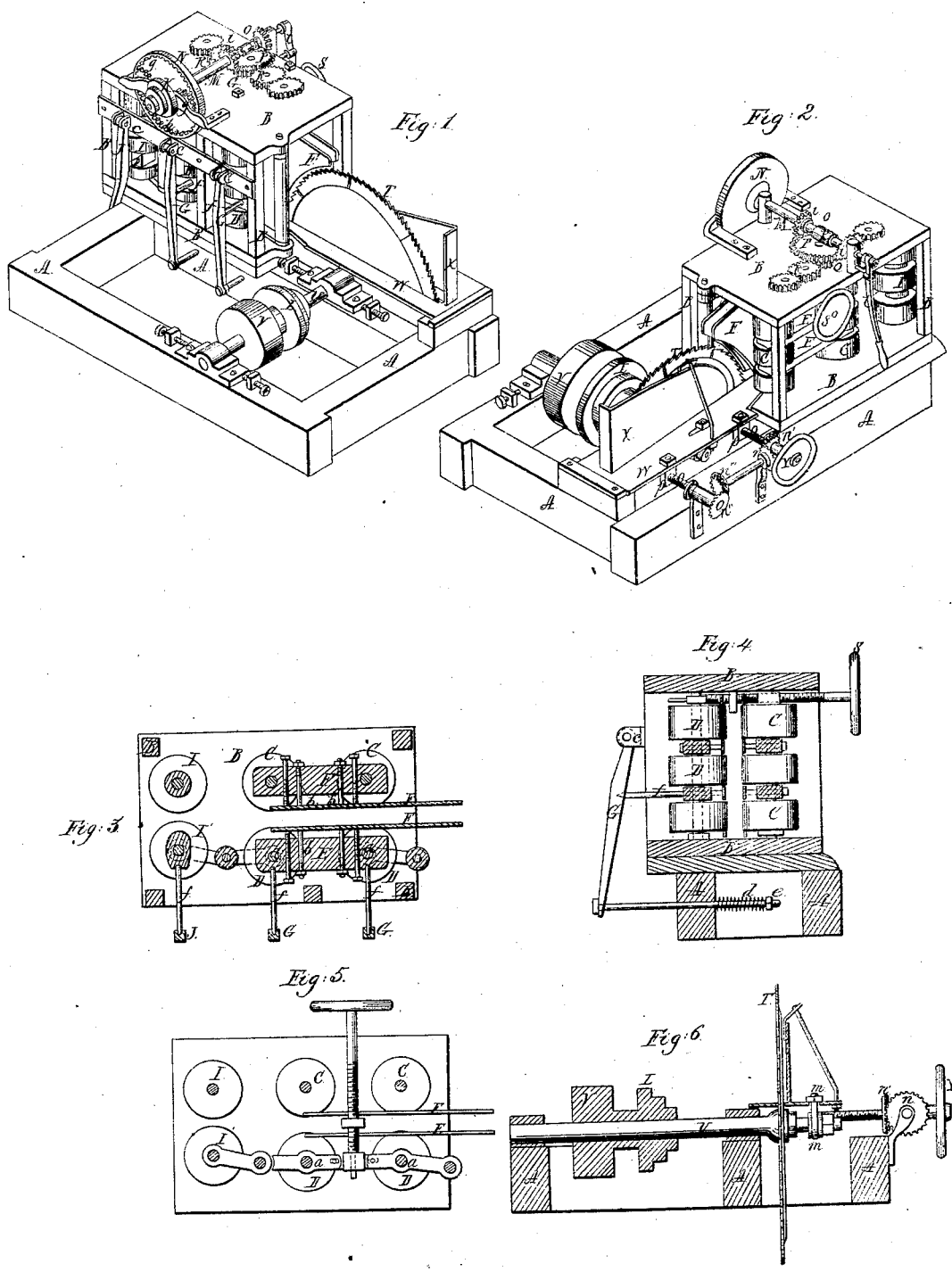

WILLIAM D. LEAVITT, OF CINCINNATI, OHIO.

RESAWING-MACHINE.

Specification of Letters Patent No. 21,838, dated October 19, 1858.

*To all whom it may concern:*

Be it known that I, WILLIAM D. LEAVITT, of Cincinnati, in the county of Hamilton and State of Ohio, have invented certain new and useful Improvements in Machines for Resawing Lumber; and I do hereby declare the following to be a full, clear, and exact description of the construction and operation of the same, reference being had to the accompanying drawings, making a part of this specification, in which—

Figure 1 represents a perspective view of said machine, Fig. 2, represents a perspective view of the same as seen from the reversed side of Fig. 1. Fig. 3, represents a horizontal section through the feed rolls and their supporting frame. Fig. 4 represents a vertical cross section through the frame which supports the feed roll. Fig. 5, represents a top view of the feed rolls and clamping plates. Fig. 6, represents a vertical cross section through the saw frame.

Similar letters of reference where they occur in the separate figures, denote like parts of the machine in all of them.

The nature of my invention consists first, in manner in which I have combined the feed rolls and their yokes, with the clamps, for feeding the lumber to the saw, and taking out the bends or warps before, and while acted on by the saw. Secondly, in combining with the feed rolls and clamps a pair of auxiliary feed rolls, that will clamp and feed in the various thicknesses of boards or planks as they are presented without effecting the feed rolls that have a board or plank of a different thickness between them for the time being.

To enable others skilled in the art to make and use my invention, I will proceed to describe the same with reference to the drawings.

A, represents a substantial frame, upon which is mounted a secondary frame B, that carries the feeding apparatus, and clamps, for feeding and straightening the lumber that is to be resawed. In this frame B, there is placed a pair of sectional feed rolls C, C, that turn in fixed bearings and opposite to them another pair of similar rolls D, D, that turn in movable bearings, $a, a$, so that they may adapt themselves to the varying thickness of the lumber fed through between them. These two pairs of rolls C, C, and D, D, have yokes E E, connected to them, and to these yokes respectively are connected by set screws $b, b$ or otherwise, the clamps or clamp-plate F F. The clamp plate attached to the rolls C, C, can be moved independently of said rolls, so as to cause it to press more or less against the lumber, the rolls C, C, themselves as before stated moving in fixed bearings. The other clamp viz: the one attached to the elastic rolls D moves with said rolls, as they adapt themselves to the variable thickness of the material passed through between them, but it has also an adjustment by means of its set screws $b$, independent of said elastic or yielding rolls D, D.

In order that the yielding rolls D, and their clamp, may press with sufficient force against the board or plank, to feed it through as well as to press out all the warps, bends, or windings therein—levers G, G, are provided, which may be pivoted at $c$, to the frame B, and to their lower ends, springs $d$, are connected which may be taken up or let out by nuts $e$, to increase or diminish their power. A presser bar or rod $f$, projects from these levers G, G, to and against the yoke E, and thus forces said rolls, and their clamp plate hard up against the board or plank.

In rear of the feed rollers C C and D, D, are a pair of auxiliary rolls I, I', also made in sections—one of which (I), turns in fixed bearings, and the other one (I'), in movable bearings—the one (I') being pressed up by a lever J, with a spring and presser bar or rod attached, as in the above described cases. These rolls I I', are entirely independent of those C C and D, D, so that they may grasp and feed up a board or plank of different thickness from that which may be between the feed rolls proper. It will be remembered that the feed rolls C C, and D, D, are yoked together, and that any movement of one roll in the pair, must affect the other one to an extent because of their being connected. This being the case, the auxiliary rolls become necessary so as to prevent a thicker or thinner board or plank from influencing the rolls that are feeding the board or plank in advance of it.

The feed rolls are operated as follows: K, is a pulley over which the belt from a pulley L, on the saw shaft may pass to give it motion. On the shaft M, to which the pulley K is fixed, is a pinion which gears with and turns two other pinions $g$, $g$, and these latter mesh with the internal gear $h$, on the wheel N, and give it motion, and through it the shaft $o$, upon which are two beveled pinions $i$, $i$, which are loose thereon, and actuated by a clutch $k$, which has a lever $l$ attached to it for that purpose. The bevel gears $i$ take into and turn a bevel gear wheel P, underneath there is a wheel Q, that by the action of intermediate wheels R R, gives motion to the several rollers on that side, all of said rollers turning in fixed bearings.

S, is a hand wheel, on a screw shaft that passes through and into or against the arms or bearers of the elastic rolls, so that said rolls may be drawn toward or from their fellows; the clamp plates have openings in them through which sufficient of the rolls may project to catch against the boards or plank.

The saw T, may be of the kind, and furnished with a spreader, as described in an application I now have before the Patent Office. It is hung on a shaft U, which has no collars next its boxes, so that it may slide endwise. This shaft U, may be driven by a belt passing over the pulley V, placed on it.

W, is a table, to which the spreader X, is attached. The saw shaft U, is connected to the table W, by means of a collar, or lug, and a nut $m$—and the table is made adjustable by means of the hand wheel Y, and a system of bevel gears $n$, $n'$, $n''$, $n'''$, which operate two screw shafts $o$, $o$, attached to the main frame, and working in nuts $p$, $p$, attached to said table. The gears $n$, $n'$, $n''$, $n'''$, and the screw shafts are graduated, so that the operator will know exactly how far to turn the hand wheel Y, to adjust the saw to the center of each passing board or plank. As for instance, suppose one turn of the hand wheel will move the table a quarter of an inch. Now if the board that is being resawed is one inch thick, and the next board following it be one and a quarter inch then a half turn of the wheel Y, will bring the saw to the exact center of said board. Any other variation may be compensated for, by a fixed rule, and without guessing or an approximation to accuracy.

In the machine which I am now, and have been for some time running, I move the table and saw, by means of a rock shaft, and cams, or projections thereon, but I prefer the hand wheel and gear, and screw rods, as more accurate.

Weighted levers may be substituted for the spring levers that control the elastic rollers, as heretofore done, from one set of rolls to the next set, but they press out all the bends in the board, hold them so pressed out after the board has passed the feed rolls, and continue to hold said warps or bends so pressed out, up to, or slightly past, the cutting part of the saw. Or, in other words the board by my clamps, is presented to the saw, in a perfectly true perpendicular line, while the guides heretofore referred to, incidentally press out the bends in the boards, where it is no object to do so, and allow the bends to return before the board reaches the saw, where the pressing out of the warps is essential.

Having thus described the nature and operation of my invention, what I claim therein as new, and desire to secure by Letters Patent is—

1. The combination of the yoked feed rollers, and clamps extending up to, or near the perimeter of the saw for the purpose of feeding through, and pressing out all the warps or bends in the board or plank and holding them so pressed out until the same acts substantially as described.

2. I also claim in combination with the yoked feed rolls, and clamps, operating together as described, the auxiliary feed rolls I, I', to receive and feed in the next succeeding board or plank, without affecting the action of the other rolls on the plank or board being sawed, substantially as described.

WILLIAM D. LEAVITT.

Witnesses:
 THOS. H. UPPERMAN,
 E. COHEN.